United States Patent Office 3,808,187
Patented Apr. 30, 1974

3,808,187
POLYMERIZATION OF ISOBUTYLENE
Klaus Steigerwald, Ludwigshafen, and Hermann Gueterbock, Friedelsheim, Germany, assignors to Badische Anilin- & Soda-Fabrik Aktiengesellschaft, Ludwigshafen (Rhine), Germany
No Drawing. Filed Dec. 8, 1971, Ser. No. 206,146
Claims priority, application Germany, Dec. 12, 1970,
P 20 61 289.9; Apr. 19, 1971, P 21 18 869.2
Int. Cl. C08f 1/72
U.S. Cl. 260—94.8   6 Claims

ABSTRACT OF THE DISCLOSURE

The production of polyisobutylene by polymerizing isobutylene at a temperature below 0° C. in an inert solvent with a Friedel-Crafts catalyst in the presence of from 10 to 5000 p.p.m. of an alcohol and 0.1 to 2000 p.p.m. of formaldehyde or 0.1 to 20,000 p.p.m. of a halogen-substituted aldehyde, p.p.m. in each case being with reference to isobutylene.

The present invention relates to a process for the polymerization of isobutylene at temperatures below 0° C. in an inert diluent with a Friedel-Crafts catalyst in the presence of a polymerization accelerator.

It is known that isobutylene can be polymerized at temperatures below 0° C. using Friedel-Crafts catalysts which may be dissolved in a solvent. The molecular weight of the polymers is influenced by the activity of the catalyst, the purity of the reaction components and the temperature at which the polymerization is carried out. In industry it is advantageous to carry out the polymerization of isobutylene at a specific temperature, for example the boiling temperature of an inert diluent of low boiling point. To prepare polymers having high molecular weights, accelerators are added to the reaction mixture which not only increase the molecular weight of the polymer formed by also accelerate the reaction and bring about a reduction in the amount of catalyst. These are proton donors, for example alcohols, phenols, mineral acids and carboxylic acids. For example an addition of 0.05% by weight of methanol to isobutylene increases the molecular weight of the polyisobutylene formed from 95,000 to 240,000 if the polymerization of the isobutylene is carried out in liquid ethylene at —104° C. in the presence of boron trifluoride as catalyst. The reaction time is about ten seconds, whereas without the addition of methanol it is about four hundred seconds.

Substances known as modifiers (molecular weight regulators) are used for regulating the molecular weight of polyisobutylene at a given temperature; these act as chain stoppers depending on their concentration in the reaction mixture. Examples of such chain stoppers are n-butene, diisobutylene, mercaptans, sulfides and polysulfides. The modifiers, in addition to lowering the molecular weight of the isobutylene polymer formed, often cause a considerable increase in the reaction time and often necessitate an increase in catalyst consumption (cf. H. Güterbock, "Chemische Technologie der Kunststoffe, Polyisobutylen," Springer - Verlag, Berlin - Gottingen-Heidelberg, 1959, pages 82 to 91).

In order to prepare both high molecular weight and low molecular weight polyisobutylene at a given temperature in a given apparatus, use is made of polymerization accelerators and molecular weight regulators; the higher the concentration of modifier, the lower the molecular weight of the isobutylene polymer formed. The reaction period is however considerably prolonged. Consequently if it is desired to prepare both very high molecular weight and low molecular weight polyisobutylenes with the same space-time yields in a given apparatus, the apparatus must be so designed that the maximum residence time required can be achieved, although the high molecular weight polyisobutylene could be prepared in a much smaller apparatus. It has not hitherto been possible to shorten the reaction period the production of low molecular weight polyisobutylenes by increasing the concentration of the accelerator.

Another disadvantage of this method is that when modifiers are used for lowering the molecular weight of polyisobutylene, a longer reaction period is necessary than when preparing high molecular weight polyisobutylenes in the absence of modifiers.

It is an object of this invention to provide a process for the polymerization of isobutylene which does not have the said disadvantages.

We have found that the said object is achieved by polymerizing isobutylene at a temperature below 0° C. in an inert diluent with a Friedel-Crafts catalyst in the presence of a polymerization accelerator. The process is characterized by the fact that the polymerization is carried out in the presence of from 10 to 5000 p.p.m. of an alcohol and 0.1 to 2000 p.p.m. of formaldehyde or 0.1 to 20,000 p.p.m. of a halogen-substituted aliphatic aldehyde of the formula:

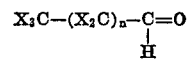

where X may be identical or different and denotes H, F, Cl or Br and $n$ stands for zero or one of the integers 1 to 10 p.p.m. in each case being based on the isobutylene used.

The process according to the invention has the advantage over prior art methods that the molecular weight of the polyisobutylene can be regulated without prolonging the residence time of the reaction mixture in the reactor. As compared with the process which uses an alcohol as accelerator, the reaction period in the process according to the invention is shorter. The reaction period does not vary appreciably with the concentration of aldehyde, but the molecular weight of the polymer depends to a marked degree on the aldehyde concentration. This discovery is surprising because formaldehyde has hitherto been used to accelerate the polymerization reaction of isobutylene and it was known that the polymers formed have a higher molecular weight than polymers which have been prepared in the absence of formaldehyde. The use of formaldehyde as an accelerator is described for example in H. Güterbock, "Chemische Technologie der Kunststoffe, Polyisobutylene," Springer - Verlag, Berlin - Göttingen-Heidelberg, 1959, page 87.

Polymerization of isobutylene by the process according to the invention is carried out substantialy in accordance with the method known for the production of isobutylene polymers. The reaction temperatures are from 0° C. to —160° C., preferably below —50° C. It is particularly advantageous to polymerize isobutylene in an inert diluent and to work at the boiling temperature of the inert diluent. It is preferred to use ethylene as the inert diluent. Examples of other suitable diluents are methane, ethane and propane.

Boron trifluoride is the preferred Friedel-Crafts catalyst for the process according to the invention. However, other Friedel-Crafts catalysts known for the polymerization of isobutylene, such as $AlCl_3$, $AlBr_3$, $BCl_3$, $SnCl_4$, $TiCl_4$, $VCl_3$ and the like and mixtures of the same, are suitable.

Polymerization of isobutylene according to the invention is carried out in the presence of a solution of formaldehyde or a halogen-substituted aliphatic aldehyde in an alcohol. Primary or secondary alcohols of one to ten carbon atoms may be used, for example methanol, ethanol, n-propanol, isopropanol, n-butanol, isobutanol, amyl alcohol, cyclohexanol, and benzyl alcohol. It is also possible to use a mixture of two or more alcohols. The amount of alcohol used, based on the isobutylene used, is from 10 to 5000 p.p.m., preferably from 100 to 1000 p.p.m.

Halogen-substituted aliphatic aldehydes for the purpose of this invention are compounds of the general formula:

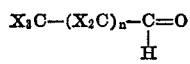

where X may be identical or different and denotes H, F, Cl or Br and $n$ stands for zero or one of the integers 1 to 10. Examples of compounds of this type are fluoral, chloral, bromal, monofluoroacetaldehyde, difluoroacetaldehyde, monochloroacetaldehyde, dichloroacetaldehyde, 2,2 - dichloropropionaldehyde, 2,3 - dichloropropionaldehyde, 2,2-difluoropropionaldehyde, 2,2,3-trichloropropionaldehyde, 2,2,3-trifluoropropionaldehyde, 2,2,3-trichlorobutyraldehyde, 4 - chlorovaleraldehyde and 2,2 - difluorobutylaldehyde.

The halogen-substituted aliphatic aldehydes are used in amounts of from 0.1 to 20,000 p.p.m. and formaldehyde in amounts of 0.1 to 2000 p.p.m. preferably 1 to 500 p.p.m., with reference to the isobutylene used in the polymerization.

The higher the concentration of halogen-substituted aliphatic aldehyde and formaldehyde, the lower the molecular weight of the polymer formed. The effectiveness of the halogen-substituted aldehydes as regards the strength of the regulating action and the shortening of the reaction period is dependent on the halogen substituents and increases in the sequence Br<Cl<F. The effectiveness of the halogen-substituted aliphatic aldehydes decreases with the distance of the substituents from the aldehyde group in the aldehyde molecule. For example the effectiveness in the case of a given halogen substituent X increases in the sequence:

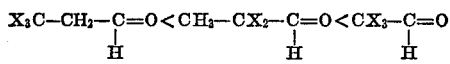

Aldehydes in which the halogen substituents are directly adjacent to the aldehyde group, for example bromal, chloral and fluoral, have proved to be particularly effective additives.

Polymerization is carried out while excluding moisture. As a rule the individual reactants do not contain more than 50 p.p.m. of water. It is preferred to use a solution of formaldehyde in isobutanol for the process according to the invention. The procedure is as follows:

A 60% aqueous solution of formaldehyde is first mixed with isobutanol at a temperature of from 50° to 60° C., after which the water is distilled off azeotropically, until paraformaldehyde begins to separate out in the apparatus. The formaldehyde content of the remaining solution can be determined by conventional analytical methods. The water content of the solution of formaldehyde in isobutanol is as a rule 10 to 30 p.p.m. To polymerize the isobutylene, there is added to a liquefied mixture of isobutylene and ethylene a specific amount of the said solution and then a solution of gaseous boron trifluoride in liquid ethylene. Reaction proceeds with boiling and evaporation of the ethylene and is over within a few seconds.

Solutions of formaldehyde in the other alcohols specified may be prepared analogously. In some cases, for example in the case of ethanol, it is necessary to remove the water azeotropically for example by adding benzene. Solutions of formaldehyde in such alcohols may advantageously be prepared by depolymerization of paraformaldehyde and passing the monomeric formaldehyde formed into the anhydrous alcohol. These solutions contain up to 40% by weight of formaldehyde. It is known that formaldehyde dissolves very readily in alcohols (cf. J. F. Walkter, "Formaldehyde," Reinhold Publishing Corporation, Chapman and Hall Ltd., London, 1964). Such solutions, in contrast to solutions in nonpolar solvents, can be prepared in a relatively high concentration and are stable over a wide temperature range.

Solutions of a halogn-substituted aliphatic aldehyde and an alcohol to be used according to the invention are also prepared by combining the components. Hemiacetals form depending on the relative proportions of the individual components.

Polymerization of isobutylene may be carried out batchwise or continuously analogously to the prior art methods. Film or sheeting or mixtures with other plastics, for example polyethylene, may be prepared from the isobutylene polymers prepared according to the invention.

The process according to the invention is illustrated by the following examples. The molecular weights given in the examples have been determined according to Staudinger.

EXAMPLE 1

10 parts of isobutylene and 10 parts of 60% aqueous formaldehyde solution are mixed together at 60° C. Water is distilled off azeotropically until paraformaldehyde begins to separate in the apparatus, the boiling point rising from 89° C. to 94° C. Distillation is stopped. The solution remaining in the distilling flask has a formaldehyde content of 37%. The water content of the solution is 20 p.p.m.

While excluding moisture, 20 ccm. of pure dried liquid isobtuylene is mixed at a temperature of —7° C. with the solution of formaldehyde in isobutanol so that the isobutylene contains 1000 p.p.m. of isobutanol and 5 p.p.m. of formaldehyde, both based on the isobutylene used. After 30 ccm. of pure dried liquid ethylene has been added, a solution of 40 ccm. of gaseous boron trifluoride in 30 ccm. of liquid ethylene is added. Polymerization is over after four seconds. A white polyisobutylene is obtained which has a molecular weight of 215,000.

EXAMPLE 2

The procedure described in Example 1 is followed but the isobutylene polymerization is carried out in the presence of 1000 p.p.m. of isobutanol and 25 p.p.m. of formaldehyde, both based on the isobutylene used. The reaction is over after two seconds. A white polyisobutylene is obtained which has a molecular weight of 141,000.

EXAMPLE 3

The procedure described in Example 1 is followed but 100 p.p.m. of formaldehyde (dissolved in the isobutanol) is added together with the 1000 p.p.m. of isobutanol. The reaction is over after one second. A white polyisobutylene is obtained which has a molecular weight of 77,000.

COMPARATIVE EXAMPLES 1 TO 6

While excluding moisture, 1000 p.p.m. of isobutanol and the amount of diisobutylene given in the table (both based on the isobutylene used) are added to a temperature of —7° C. to 20 ccm. of pure dried liquid isobutylene. After 30 ccm. of pure dried liquid ethylene has been added, a solution of 40 ccm. of gaseous boron trifluoride in 30 ccm. of liquid ethylene is added. The reaction proceeds with boiling and evaporation of the ethylene and is over after the reaction period given in the table. As the comparative examples show, the reaction period depends to a very marked degree on the amount of modifier (diisobutylene) added, whereas according to the invention it is possible, by varying the concentration of formaldehyde in the isobutanol, to regulate the molecular weight without prolonging the reaction period.

| Number | 1 | 2 | 3 | 4 | 5 | 6 |
|---|---|---|---|---|---|---|
| Diisobutylene (p.p.m.) | 0 | 10 | 100 | 500 | 1,000 | 2,500 |
| Reaction time (seconds) | 5 | 9 | 20 | 35 | 45 | 65 |
| Molecular weight (×1,000) | 260 | 240 | 160 | 100 | 80 | 45 |

EXAMPLE 4

The procedure described in Example 1 is followed, but 1000 p.p.m. of n-propanol and, dissolved therein, 10 p.p.m. of formaldehyde are added, p.p.m. in each case being based on the isobutylene used. The reaction is over after eight seconds. A white polyisobutylene is obtained which has a molecular weight of 193,000.

EXAMPLE 5

The procedure described in Example 1 is followed, but 1000 p.p.m. of n-propanol and, dissolved therein, 200 p.p.m. of formaldehyde are added, p.p.m. in each case being based on the isobutylene used. The reaction is over after two seconds. A white polyisobutylene is obtained which has a molecular weight of 90,000.

EXAMPLE 6

The procedure described in Example 1 is followed, but 1000 p.p.m. of amyl alcohol and, dissolved therein, 10 p.p.m. of formaldehyde are added, p.p.m. in each case being based on the isobutylene used. The reaction is over after seven seconds. A white polyisobutylene is obtained which has a molecular weight of 210,000.

EXAMPLE 7

The procedure described in Example 1 is followed, but 1000 p.p.m. of amyl alcohol and, dissolved therein, 30 p.p.m. of formaldehyde are added, p.p.m. in each case being with reference to the isobutylene used. The reaction is over after three seconds. A white polyisobutylene is obtained which has a molecular weight of 110,000.

EXAMPLES 8 TO 27

While excluding moisture, 20 ccm. of pure liquid isobutylene which has been dried with $CaCl_2$ or molecular sieves is mixed at a temperature of $-7°$ C. with a solution of a haloaldehyde in an alcohol. The concentration of the alcohol is 1000 p.p.m. in all these examples and the concentration of the haloaldehyde is varied between 2.5 and 10,000 p.p.m., p.p.m. in each case being based on the isobutylene used. After 30 ccm. of pure dried liquid ethylene has been added, a solution of 40 ccm. of gaseous boron trifluoride condensed in 30 ccm. of liquid ethylene is added. Polymerization proceeds with evaporation of ethylene so that the polyisobutylene remains as a residue. Conversion in all examples is from about 90 to 95%. The results obtained in the individual examples are given in Table 2:

The following abbreviations are used:

p.p.m. HA=p.p.m. of haloaldehyde
RP=reaction period in seconds
MW=molecular weight ($\times 1000$)
B=bromal
C=chloral
F=fluoral

TABLE 2

| Number | Alcohol | p.p.m. HA | RP | MW |
|---|---|---|---|---|
| 8 | Isobutanol | 75B | 10 | 200 |
| 9 | do | 7,500B | 7 | 74 |
| 10 | Cyclohexanol | 50B | 13 | 255 |
| 11 | do | 750B | 6 | 155 |
| 12 | Benzyl alcohol | 1,000B | 10 | 173 |
| 13 | do | 7,500B | 7 | 90 |
| 14 | Isobutanol | 10C | 6 | 250 |
| 15 | do | 2,500C | 15 | 71 |
| 16 | Isoamyl alcohol | 1,000C | 13 | 105 |
| 17 | do | 2,500C | 14 | 79 |
| 18 | Benzyl alcohol | 25C | 13 | 270 |
| 19 | do | 5,000C | 14 | 65 |
| 20 | Cyclohexanol | 5C | 14 | 250 |
| 21 | do | 10,000C | 12 | 48 |
| 22 | Isopropanol | 10F | 8 | 193 |
| 23 | do | 750F | 9 | 56 |
| 24 | Isoamyl alcohol | 2.5F | 9 | 227 |
| 25 | do | 2,000F | 5 | 4 |
| 26 | Benzyl alcohol | 7.5F | 9 | 23 |
| 27 | do | 1,500F | 2 | 60 |

COMPARATIVE EXAMPLES 7 TO 11

Isobutylene is polymerized as described above but in the absence of halogen-substituted aldehydes in the presence of 1000 p.p.m. of an alcohol. The results given in Table 3 are obtained.

TABLE 3

| Number | Alcohol | Reaction period (seconds) | Molecular weight ($\times 1,000$) |
|---|---|---|---|
| 7 | Ethanol | 25 | 235 |
| 8 | Isopropanol | 20 | 260 |
| 9 | Isobutanol | 16 | 286 |
| 10 | Cyclohexanol | 21 | 278 |
| 11 | Benzyl alcohol | 34 | 286 |

We claim:

1. A process for the production of polyisobutylene which comprises polymerizing isobutylene at a temperature below 0° C. in an inert solvent with a Friedel-Crafts catalyst in the presence of 10 to 5,000 p.p.m., with reference to isobutylene, of (a) an alcohol selected from the group consisting of a primary and a secondary alcohol having from 1 to 10 carbon atoms, and (b) 0.1 to 2,000 p.p.m., with reference to isobutylene, of formaldehyde or 0.1 to 20,000 p.p.m., with reference to isobutylene, of a halogen-substituted aldehyde having the formula:

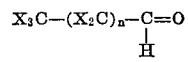

where
X may be identical or different and denotes hydrogen, fluorine, chlorine or bromine, at least one X denoting fluorine, chlorine or bromine, and
$n$ stands for zero or one of the integers 1 to 10.

2. A process as claimed in claim 1 carried out at a temperature below $-50°$ C.

3. A process as claimed in claim 1 carried out in the presence of 1 to 500 p.p.m. of formaldehyde.

4. A process as claimed in claim 1 carried out with a solution of formaldehyde in isobutanol.

5. A process for the production of polyisobutylene which comprises polymerizing isobutylene at a temperature below 0° C. in an inert solvent with a Friedel-Crafts catalyst in the presence of 10 to 5,000 p.p.m., with reference to isobutylene, of (a) an alcohol selected from the group consisting of a primary and a secondary alcohol having from 1 to 10 carbon atoms, and 0.1 to 20,000 p.p.m,. with reference to the isobutylene, of a halogen-substituted aldehyde having the formula:

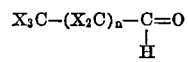

where
X may be identical or different and denotes hydrogen, fluorine, chlorine or bromine, at least one X denoting fluorine, bromine or cholrine and
$n$ stands for zero or one of the integers 1 to 10.

6. A process as claimed in claim 5 wherein the compound (b) is fluoral, chloral or bromal.

References Cited

UNITED STATES PATENTS 2,344,213   3/1944   Otto ---------------- 260—93

STANFORD M. LEVIN, Primary Examiner